April 12, 1949. E. A. ROCKWELL 2,467,273
POWER APPARATUS WITH TRAVEL CONTROL
Original Filed June 13, 1941
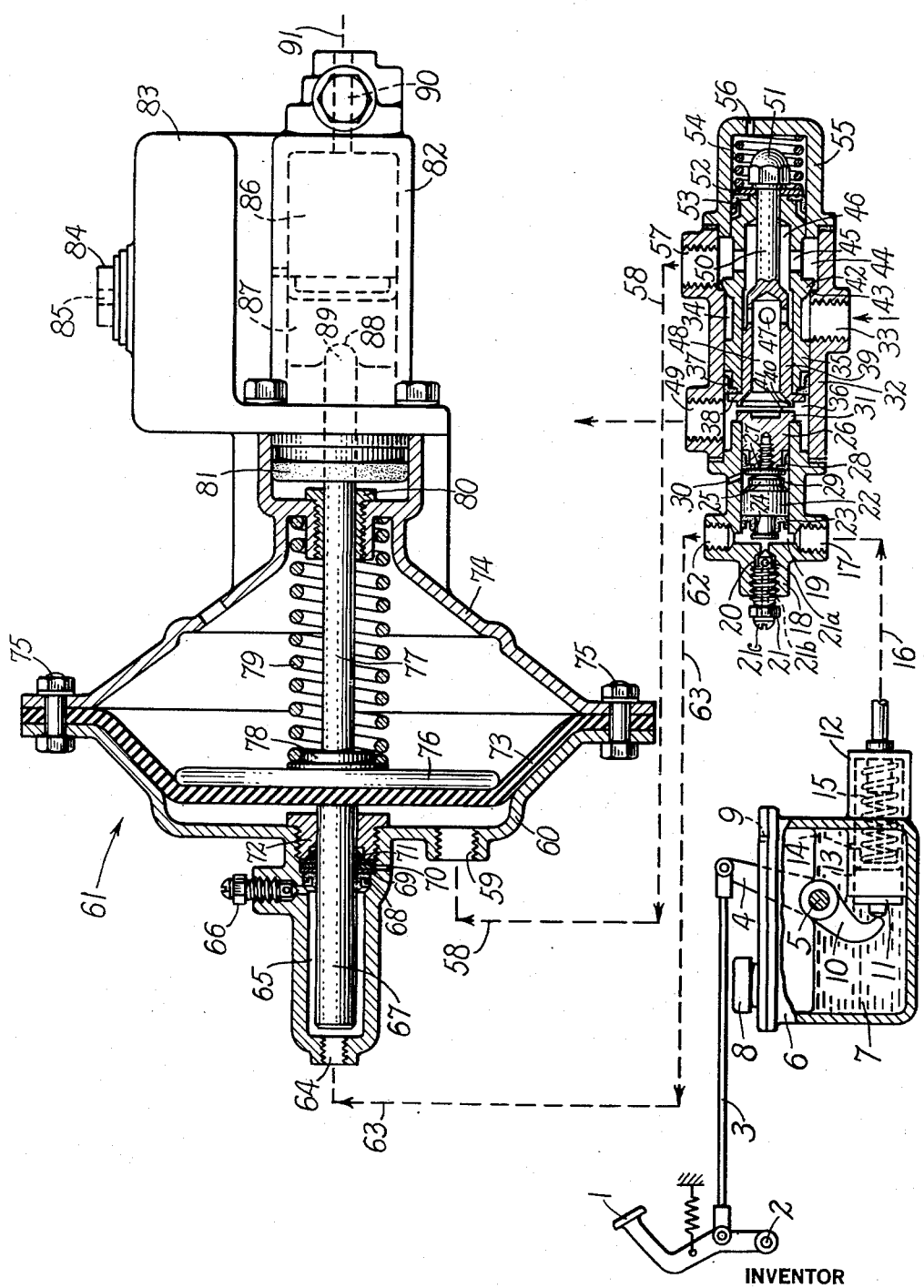
INVENTOR
*Edward A. Rockwell*
BY
*Arthur Wright*
ATTORNEY Patented Apr. 12, 1949

2,467,273

UNITED STATES PATENT OFFICE 2,467,273

POWER APPARATUS WITH TRAVEL CONTROL

Edward A. Rockwell, Cleveland, Ohio

Original application June 13, 1941, Serial No. 397,896, now Patent No. 2,372,014, dated March 20, 1945. Divided and this application October 11, 1944, Serial No. 558,176

16 Claims. (Cl. 60—54.5)

My invention relates particularly to an apparatus designed for actuating the movement of any desired part in such a way as to coordinate the travel of said part with the travel of the means which actuates the same, the same being accomplished by the interposition of a fluid, as for example hydraulic liquid with an advantageous mode of liquid compensation.

This application is a division of my application upon Travel control actuating device, Ser. No. 397,896, filed June 13, 1941, Pat. No. 2,372,014, granted March 20, 1945.

The object of my invention is to provide an apparatus of the above character whereby parts to be moved may be effectively operated through the agency of a fluid while coordinating the travel of the part to be moved with the means for moving the same. A further object is to accomplish this by applying any desired modulated pressure at any point in the said movement. One of the objects, furthermore, is to apply the travel control mechanism to the operation of air brake systems, that is to say air brakes operated by the application of compressed air. Further objects of my invention will appear from the detailed description of the same hereinafter.

While my invention is capable of embodiment in many different forms for the purpose of illustration I have shown only one form of the same in the accompanying drawing, in which—

The figure is a diagrammatic vertical section showing a travel controlled air brake system operated with compressed air.

In the drawing, the travel control features of my invention are applied to the operation of automotive vehicle brake systems including the use of compressed air. As shown in the figure, I have provided a pedal 1 carried by a fixed pivot 2 on the chassis of an automobile (not shown). The pedal 1 is pivotally connected by a link 3 to an operating lever 4 mounted on a shaft 5 extending into a master cylinder 6, which may be of any desired construction, as for example the master cylinder as disclosed in the Loughead Patent No. 1,707,063, granted March 26, 1929, on Pressure mechanism for brake systems. As shown in the drawing, for example, the master cylinder 6 may have the usual reservoir 7 and the usual filling cap 8 as well as the usual vent 9. The shaft 5 which extends into the master cylinder 6, furthermore, may be provided with an operating lever 10 which bears on a piston 11 in a cylinder 12 provided with a piston 13 so placed that in the retracted position thereof it uncovers a compensating port 14. The said piston 13 is retracted by a spring 15. The liquid discharged from the master cylinder 6 is supplied by a pipe 16 to an inlet port 17 which is located in a plunger housing 18 having therein a chamber 19. The chamber 19 can be vented from time to time, as desired, through a passageway 20 leading to an air bleeder screw plug 21 having a transverse passageway 21a leading to a longitudinal passageway 21b which is adapted to be closed normally by a removable screw plug 21c. Within the chamber 19 there is a plunger 22 having a U-shaped rubber seal 23 carried in an annular recess 24 on the forward part of said plunger. The rear of said plunger 22 has an extension 25 which is arranged to move rearwardly a valve plunger 26 having a screw head 27 thereon holding in place a leather gasket 28. Between the extension 25 and the screw head 27 there is a space 29 which is vented to the outer air through a small port 30. The rear end of the valve plunger 26 has a flange 31 which extends over the end of the plunger housing 19 within a valve casing 32. The said valve casing 32 has an inlet port 33 which is adapted to be connected with any suitable source of compressed air. The compressed air thus admitted is received in an annular chamber 34 on the periphery of a cylindrical valve member 35 located in a cylindrical chamber 36 in the valve casing 32 within which it is sealed by a leather gasket 37 which is located adjacent to a flange 37 on an internal tubular valve member 39 located within the valve member 35. The said internal tubular valve member 39 is, furthermore, provided with an annular valve element 40 which cooperates with a valve seat 41 on the valve plunger 26. Adjacent to the chamber 34 the valve member 35 has located thereon a tapered valve element 42 which cooperates with a valve 43 on the valve casing 32. When the conical valve 42 is unseated the compressed air is then admitted to an annular chamber 44 in the casing 32, which in turn admits the air through radial ports 45 in the valve member 35 to a cylindrical chamber 46 in the cylindrical valve member 35 in which chamber the internal valve member 39 is located. The air thus admitted to the chamber 46 can pass through radial openings 47 in the internal tubular valve member 39 to a cylindrical chamber 48 within said member 39 so that when the valve 40, 41 is open the released air can pass out through an exhaust port 49 in the casing 32. It will be noted that the internal tubular valve member 39 has extending rearwardly therefrom a rod 50 which passes through the end of the valve member 35 and is held in place thereon by a nut 51 which, by means of a washer 52, clamps in place a leather gasket 53. A spring 54 rests against the said washer 52 and at the other end rests against the inside of a head 55 secured to the valve casing 32. The head 55 also has a vent 56. The said head 55 and the plunger housing 18 can be secured to the valve casing 32 in any desired way. The compressed air when admitted to the chamber 49, when the valve 40, 41 is in closed position, passes out by an air pressure port 57 by a pipe 58 to an inlet port 49 in a forward shell 60 of a compressed air power unit 61. This supply of compressed air through the pipe 58 will not take place, however, until after sufficient pressure has been exerted through the pipe 16 so as to move the plunger 22, close the valve 40, 41 and open the valve 42, 43. Before the said valves are moved in this way, however, the manual hydraulic pressure will have passed initially from the chamber 19 through an outlet port 62 and thence through a pipe 63 to an inlet port 64 on the forward shell 60 of the power unit 61. The inlet port 64 communicates with a monitor chamber 65 having an air bleeder 66 constructed like the air bleeders previously described herein, and extending into the said chamber there is a monitor plunger 67 which passes through an annular rubber seal 68, a washer 69, adjacent to which there is a venting port 70, and then through a leather washer 71 held in place by a screw-threaded guiding sleeve 72 at the end of the chamber 65. The rear end of the monitor plunger 67 is flat and rests against a flexible diaphragm 73 of any desired material impervious to the air, as for example a laminated oil-treated woven fabric, the said diaphragm being clamped at its periphery between the shell 60 and a rear shell 74 by means of screws 75. Against the rear face of the flexible diaphragm 73 a head 76 rests, which head is carried on a piston rod 77 by being screw-threaded to a recessed ring 78 attached to said head 76. A coil spring 79, requiring less force for its compression than the spring 54, rests at one end against the ring 78 and at the other end against the interior of the shell 74. The piston rod 77 passes out through a screw-threaded bushing 80 and thence through a liquid-tight packing 81 to the interior of a master cylinder 82 having a filling chamber 83 at the upper portion thereof closed by a filling cap 84 having a vent hole 85 therein. Below the chamber 83 there is a cylinder 86 carrying a piston 87 having a recess 88 in which a rounded end 89 of the piston rod 77 rests. The liquid put under pressure in the cylinder 86 passes out of the mast cylinder through an outlet port 90 having a pipe 91 connected thereto which leads to the usual wheel brake cylinders (not shown) located on the automobile chassis.

In the operation of my invention, the apparatus disclosed herein is designed for the operation of compressed air brakes applied to any desired type of vehicle. In fact this apparatus is also designed so that it may be applied in the operation of present forms of air brake systems carried by automobiles or airplanes. In the apparatus shown, the manually supplied hydraulic liquid received from the master cylinder enters the port 7 and thence passes into the cylinder 65 having the monitor plunger 67 therein, by the movement of which the brakes may be manually applied by moving the plunger 77, master cylinder piston 87 and, accordingly, the hydraulic liquid supplied through the port 90 passes to the brake cylinders for operating the brakes manually. Due to the movement rearwardly of the monitor plunger 67 as the pedal 1 advances and as the brakes are being applied, the travel of the brakes will be coordinated to the travel of the foot pedal supplying the liquid under manual pressure to the port 17. The manual supply liquid received in the port 17 will close the valve 40, 41, the initial closure of which does not prevent the subsequent application of power by the diaphragm 73 as the further increase of the manual pressure will result in unseating the inlet valve 42 against the opposition of the spring 54 which is strong enough to normally seat the valve 42 when the manual pressure is relaxed, thereby permitting air pressure from the port 33 to pass by the ports 45 out through the port 57 in the form of modulated increments of air pressure so as to move the diaphragm 73, the plunger being maintained in contact therewith, and consequently the master cylinder piston 87 so as to apply the hydraulic pressure through the pipe 91 to the brake cylinders for applying the brakes. Accumulating pressure in the chamber 44 will close the inlet valve 42, against the yielding foot pressure on the pedal 1 when the movement of the piston 13 stops at any given point and thereafter partial or entire release of the manual pressure exerted by the pedal 1 on the liquid supplied to the port 17 will cause the valve 40, 41 to become unseated, thus exhausting the air through the exhaust port 49 and causing the diaphragm 73 to move to the left under the influence of the spring 79 so as to release the brakes.

While I have described my invention above in detail I wish it to be understood that many changes may be made therein without departing from the spirit of the same.

I claim:

1. In combination, a work-performing element, a master cylinder having a piston and a liquid compensating reservoir, a pedal for operating the same, a source of pressure fluid differing from the atmosphere pressure, a movable wall having a casing, a plunger element having a cylinder therefor, said plunger element being operable by the master cylinder and connected to one side of the movable wall, a second plunger element having a cylinder therefor, said second plunger element being operatively connected to the other side of the said wall and having a hydraulic connection to the work-performing element, a conduit connecting the first mentioned plunger cylinder to the master cylinder, a valve having a second conduit leading to said casing for controlling the application of said pressure to the movable wall and means to operate the valve connected to the first mentioned conduit and operable from the master cylinder.

2. In combination, a work-performing element, a master cylinder having a piston and a liquid compensating reservoir, a pedal for operating the same, a source of fluid pressure differing from the atmospheric pressure, a movable wall having a casing, a plunger having a cylinder therefor, said plunger being operable by the master cylinder and connected to one side of the movable wall, a second plunger having a cylinder therefor, said plunger being operatively connected to the other side of the said wall and having a hydraulic connection to the work-performing element, a conduit connected to the first mentioned plunger cylinder to the master cylinder, a valve for controlling the application of said pressure to the movable wall, means to operate the valve connected to the conduit and operable from the master cylinder, and a liquid compensating reservoir connected to the hydraulic connection leading to the work-performing element.

3. In an apparatus of the character described, an enclosed wall, having a casing, adapted to be moved by a gaseous medium, a plunger and a cylinder therefor, said plunger being operatively connected to said wall, a liquid compensating reservoir for said cylinder, a work-performing part adapted to be moved by the movement of said plunger, a control means for the apparatus, a valve apparatus having a pressure-responsive device, controlled by said means adapted to control the movement of said wall in one direction, and means for urging said wall in the opposite direction, said control means comprising a master cylinder having a piston and a liquid compensating reservoir, a hydraulic conduit leading from the master cylinder, and a fluid controlling device, including a second separate different cylinder in communication with the pressure-responsive device and having a conduit connected to the first mentioned conduit, leading to the master cylinder and plunger means therein connected to the other side of the wall from the first mentioned plunger for operating the work-performing part, constructed to have movement with said wall and constructed so as to coordinate the movement of the wall and control means and to operate as a result of the movement of said valve apparatus.

4. In an apparatus of the character described, an enclosed wall, having a casing, adapted to be moved therein, a work-performing part adapted to be moved by the movement of said plunger, a control means for the apparatus, a valve apparatus having a pressure-responsive device, controlled by said means adapted to control the movement of said wall in one direction, and means for urging said wall in the opposite direction, said control means comprising a master cylinder having a piston and a liquid compensating reservoir, a hydraulic conduit leading from the master cylinder, and a fluid controlling device, including a cylinder in communication with the pressure-responsive device and having a conduit, connected to the first mentioned conduit, leading to the master cylinder, a pressure-increasing plunger connected to said wall and plunger means therein connected to the other side of the wall from the pressure-increasing plunger for operating the work-performing part, constructed to have movement with said wall and constructed so as to coordinate the movement of the wall and control means and to operate as a result of the movement of said valve apparatus, said pressure-increasing plunger being provided with a second separate different cylinder and a liquid compensating reservoir.

5. In an apparatus of the character described, an enclosed wall, having a casing adapted to be moved therein, a part adapted to be operated hydraulically by the movement of said wall, a manually operable hydraulic control means for moving said wall, including a master cylinder having a piston and a liquid compensating reservoir, a hydraulic conduit therefrom, conveying liquid under pressure to actuate the latter, a valve apparatus having a pressure-responsive device controlled by said manual means adapted to control the movement of said wall in one direction, means for urging said wall in the opposite direction, and a fluid controlling device including a cylinder in communication with the pressure-responsive device and having a conduit leading to the master cylinder, a pressure-increasing plunger connected to said wall and plunger means therein for operating said part connected to the other side of the wall from the pressure-increasing plunger, constructed to have movement with the wall, controlled by said control means and constructed so as to coordinate the movement of the wall and control means and to operate as a result of the movement of said valve apparatus, said pressure-increasing plunger being provided with a second separate different cylinder having a liquid compensating reservoir, and said pressure-increasing plunger being attached to the plunger of said device.

6. An apparatus comprising a diaphragm, two casing members between which it is clamped, a source of pressure different from the atmospheric pressure connected to the casing for moving the diaphragm, a plunger connected to the movable wall so as to move coordinately therewith, having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, and an air bleeder between which and said diaphragm the seal is located.

7. An apparatus comprising a diaphragm, two casing members between which it is clamped, a source of pressure different from the atmospheric pressure connected to the casing for moving the diaphragm, a plunger connected to the movable wall so as to move coordinately therewith, having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, an air bleeder between which and said diaphragm the seal is located, and a master cylinder, having a liquid compensating reservoir, connected to said cylinder.

8. An apparatus comprising a diaphragm, two casing members between which it is clamped, a source of pressure different from the atmospheric pressure connected to the casing for moving the diaphragm, a plunger connected to the movable wall having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, an air bleeder between which and said diaphragm the seal is located, and a pressure-fluid controlling pressure-responsive valve, having a conduit, hydraulically connecting the valve to said cylinder.

9. An apparatus comprising a diaphragm, two casing members between which it is clamped, a source of pressure different from the atmospheric pressure connected to the casing for moving the diaphragm, a plunger connected to the movable wall having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, an air bleeder between which and said diaphragm the seal is located, a master cylinder, having a liquid compensating reservoir, a conduit connected to said cylinder, a pressure-fluid controlling pressure-responsive valve operating means in said conduit hydraulically connected to the conduit leading to said cylinder and a valve operated by said means for controlling the admission of the fluid from said source of pressure to said movable wall.

10. An apparatus comprising a diaphragm, two casing members between which it is clamped, a source of pressure different from the atmospheric pressure connected to the casing for moving the diaphragm, a plunger connected to the movable wall having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, an air bleeder between which and said diaphragm the seal is located, a pressure-fluid controlling pressure-responsive valve hydraulically connected to said cylinder, and having a conduit, containing means to operate said valve, said conduit being located, outside said casing leading to said casing to control the admission of the pressure fluid to the diaphragm.

11. An apparatus comprising a diaphragm, two casing members between which it is clamped, a source of pressure different from the atmospheric pressure connected to the casing for moving the diaphragm, a plunger connected to the movable wall having a cylinder and a hydraulic connection to a part to be moved to perform work, another hydraulic plunger connected with the other side of the movable wall, an extension on one of said casing members having a cylinder in which the second plunger operates, a seal for the second plunger between said cylinder and the diaphragm casing, an air bleeder between which and said diaphragm the seal is located, a master cylinder, having a liquid compensating reservoir, connected to said cylinder, a pressure-fluid controlling pressure-responsive valve hydraulically connected to said cylinder, and having a conduit, containing means to operate said valve, said conduit being located, outside said casing and leading to said casing to control the admission of the pressure fluid to the diaphragm.

12. In combination, a master cylinder having a piston and a liquid compensating reservoir, a pedal for operating the same, a valve mechanism being provided with a connection controlled by the liquid received from the master cylinder, a source of a fluid pressure differing from the atmospheric pressure, controlled by the valve mechanism, a wall movable by said pressure, a plunger connected to the movable wall, said plunger having a chamber provided with a communication hydraulically connected to the master cylinder to exert pressure on the movable wall from the master cylinder by means of said cylinder and chamber exerting a direct thrust on the movable wall and said wall having a casing connected to said source of fluid pressure to receive fluid from said source, a plunger in a cylinder operated by said wall and said first mentioned plunger and arranged to receive the combined forces from the pedal and the pressure differing from the atmosphere, a conduit for liquid, supplied by liquid from said plunger, to a work-performing means, and a liquid compensating reservoir connected to said conduit.

13. In combination, a master cylinder having a piston and a liquid compensating reservoir, a pedal for operating the same, a valve mechanism being provided with a connection controlled by the liquid received from the master cylinder, a source of a fluid pressure differing from the atmospheric pressure, controlled by the valve mechanism, a wall movable by said pressure said wall having a casing connected to said source of fluid pressure, a plunger in a cylinder operated by said wall, a second plunger operable with the movable wall and a chamber for said plunger having a communication connected to the master cylinder to apply pressure against said movable wall by means of said second plunger and chamber exerting a direct thrust on said movable wall and therefrom onto the first mentioned plunger, a conduit for liquid, supplied by liquid from said plunger, to a work-performing means, and a liquid compensating reservoir connected to said conduit.

14. In combination, a master cylinder having a piston and a liquid compensating reservoir, a pedal for operating the same, a valve mechanism being provided with a connection controlled by the liquid received from the master cylinder, a source of a fluid pressure differing from the atmospheric pressure, controlled by the valve mechanism, a wall movable by said pressure said wall having a casing connected to said source of fluid pressure, a plunger in a cylinder operated by said wall, a second plunger operable with the movable wall and located on the opposite side thereof from the first mentioned plunger, a chamber for said second plunger having a communication connected to the master cylinder to apply pressure against said movable wall by means of said second plunger and chamber exerting a direct thrust on said movable wall and therefrom onto the first mentioned plunger, a conduit for liquid, supplied by liquid from said plunger, to a work-performing means, and a liquid compensating reservoir connected to said conduit.

15. In combination, a work-performing element, a master cylinder having a piston and a liquid compensating reservoir, a pedal for operating the same, a source of fluid pressure differing from the atmospheric pressure, a movable wall having a casing, a plunger element having a cylinder therefor, said plunger element being operable by the master cylinder and connected to one side of the movable wall, a second plunger element having a cylinder therefor, said second plunger element being operatively connected to the other side of said wall and having a hydraulic connection to the work-performing element, a conduit connecting the first mentioned plunger cylinder to the master cylinder, a valve having a second conduit leading to said casing for controlling the application of said pressure to the movable wall, and a valve plunger means to operate the valve, having a second casing, connected to the first mentioned conduit and operable from the master cylinder.

16. In combination, a work-performing element, a master cylinder having a piston and a liquid compensating reservoir, a pedal for operating the same, a source of fluid pressure differing from the atmospheric pressure, a movable wall having a casing, a plunger element having a cylinder therefor, said plunger element being operable by the master cylinder and connected to one side of the movable wall, a second plunger element having a cylinder therefor, said second plunger element being operatively connected to the other side of said wall and having a hydraulic connection to the work-performing element, a conduit connecting the first mentioned plunger cylinder to the master cylinder, a valve having a second conduit leading to said casing for controlling the application of said pressure to the movable wall, and a valve plunger means to operate the valve, having a second casing, connected to the first mentioned conduit and operable from the master cylinder, and said valve comprising a fitting removably connected to said second casing, which fitting has a connection to said source of fluid pressure, as well as a venting connection.

EDWARD A. ROCKWELL.

REFERENCES CITED

The following references are of record in the file of this patent:

UNITED STATES PATENTS

| Number | Name | Date |
|---|---|---|
| 2,218,191 | Dick | Oct. 15, 1940 |
| 2,260,491 | Stelzer | Oct. 28, 1941 |
| 2,353,755 | Price | July 18, 1944 |
| 2,372,014 | Rockwell | Mar. 20, 1945 |